United States Patent [19]
Hill et al.

[11] Patent Number: 5,951,653
[45] Date of Patent: Sep. 14, 1999

[54] METHOD AND SYSTEM FOR COORDINATING ACCESS TO OBJECTS OF DIFFERENT THREAD TYPES IN A SHARED MEMORY SPACE

[75] Inventors: Richard D. Hill, Bellevue; Alexander A. Mitchell, Redmond, both of Wash.

[73] Assignee: Microsoft Corporation, Redmond, Wash.

[21] Appl. No.: 08/790,295

[22] Filed: Jan. 29, 1997

[51] Int. Cl.$^6$ .................................................. G06F 15/163
[52] U.S. Cl. .......................................... 709/304; 709/303
[58] Field of Search .................................. 709/304, 303, 709/108, 100

[56] References Cited

U.S. PATENT DOCUMENTS

| | | | |
|---|---|---|---|
| 5,430,876 | 7/1995 | Schreiber et al. | 709/304 |
| 5,452,459 | 9/1995 | Drury et al. | 707/3 |
| 5,463,625 | 10/1995 | Yasrebi | 370/401 |
| 5,596,579 | 1/1997 | Yasrebi | 709/304 |
| 5,787,281 | 7/1998 | Schreiber et al. | 709/304 |

OTHER PUBLICATIONS

Karuzis, M., "Supporting Threadless DCE Clients," rfc31.0.txt at www.pilgrim.umass.edu, Oct. 29, 1996, pp. 1–8.

Salz, R., "DCE 1.2 Contents Overview," rfc63.3.txt at www.pilgrim.umass.edu, Oct. 29, 1996, pp. 1–14.

"OLE 2 Programmer's Reference—Working with Windows™ Objects," *Microsoft Corporation*, vol. One, Chapter 1, 1994, pp. 3–29.

Brockschmidt, Kraig, "Inside OLE,", *Microsoft Corporation*, Second Edition, Chapter 6, 1995, pp. 277–338.

"Descriptions and Workings of OLE Threading Models," in *Knowledge Base*, Microsoft Developer Network Library, Apr. 1997, Article ID: Q150777.

*Primary Examiner*—Majid A. Banankhah
*Attorney, Agent, or Firm*—Seed and Berry LLP

[57] ABSTRACT

A computer-based method and system for accessing objects of different thread types in a single process. The system provides single-threaded apartments (STAs) for loading apartment-threaded objects and a multi-threaded apartment (MTA) for loading free-threaded objects. Each STA has a single thread, and the MTA has multiple threads. When an STA thread requests to access a free-threaded object, the system creates an MTA thread and requests the MTA thread to instantiate the free-threaded object. The STA thread then receives a marshalled pointer to the free-threaded object and unmarshals the received pointer. The STA thread then accesses the free-threaded object using the unmarshalled pointer so that the MTA thread accesses the free-threaded object on behalf of the STA thread. When an MTA thread requests access to an apartment-threaded object, the system creates an STA thread and requests the STA thread to instantiate the apartment-threaded object. The MTA thread then receives a marshalled pointer to the apartment threaded object and unmarshals the received pointer. The MTA thread then accesses the apartment-threaded object using the unmarshalled pointer so that the STA thread accesses the apartment-threaded object on behalf of the MTA thread.

28 Claims, 12 Drawing Sheets

METHOD AND SYSTEM FOR COORDINATING ACCESS TO OBJECTS OF DIFFERENT THREAD TYPES IN A SHARED MEMORY SPACE

TECHNICAL FIELD

The present invention relates generally to accessing objects in a computer system and more particularly to coordinating access to objects among multiple threads.

BACKGROUND OF THE INVENTION

Most computer systems execute under the control of a multiprocessing operating system. A multiprocessing operating system is designed to control the concurrent execution of multiple computer programs. Such operating systems typically allow one program to execute for a while, and then allow another computer program to execute. Before each computer program is allowed to execute, the operating system initializes the system resources (e.g., is CPU registers) to their state when that computer program last executed and, if necessary, loads the computer program back into memory. Thus, when the computer program is allowed to execute again, its execution continues where it left off. Each executing computer program is generally referred to as a "process," and the state of the computer system when that computer program executes is referred to as the "context" of the process.

Computer programs that are executing concurrently may have the need to communicate with each other. A computer application may be implemented as multiple cooperating computer programs that each execute as separate processes. One computer program may request another computer program to perform a certain function on its behalf. Each time the operating system allows a different computer program to execute, the operating system performs what is referred to as a process context switch. The context switch involves saving the current state of the executing process so that it can continue execution at a later time, and restoring the previous state of the computer program to be executed. The saving and restoring of the contexts may place an unacceptable overhead on the computer system. To avoid the overhead of process context switching, some operating systems have implemented the concept of a lightweight process or a thread. Within a single process, the operating system may allow several threads to execute concurrently. Each thread in a process shares the same address space (i.e., code and data), but each thread has its own program counter and other register values. The operating system allows each thread in the process to execute for a while and then switches control to the next thread. Because the threads share the same address space, the context switching from one thread to another can be accomplished much faster than switching from one process to another. Thus, the concept of multithreading allows many of the advantages of multiprocessing, but without the overhead of process context switches.

Many server computer programs (i.e., servers) that provide services to multiple client computer programs (i.e., clients) are implemented using multiple threads. When a client requests the server to perform a service on behalf of the client, the server will create a thread to provide that service for the client. Thus, when multiple clients request services at approximately the same time, the server will be executing many threads. The data that a process accesses is often organized into objects that encapsulate data and code for accessing that data. Because the threads within a process share the same data, access control to the data must be coordinated by the threads. With such a multithreading server, the developer of the server is responsible for coordinating access to the objects so that the processing by one thread will not be interfered with by another thread. For example, the developer may need to ensure that appropriate synchronization mechanism (e.g., locks and semaphores) are defined for each object. A synchronization problem could occur when two threads attempt to access an object concurrently. For example, if both threads A and B need to modify the same object, then a synchronization problem could occur in the following way. When the object provides a method to increment a data member, the method may load the value of the data member into a register, increment the value, and store the value back into the data member. However, if thread A invokes the method, the current value (e.g., 10) of the data member may get loaded into a register and then a thread context switch may occur so that thread B executes. If thread B also invokes the method, the current value (e.g., 10) of the data member would be loaded into a register, incremented (e.g., 11), and stored back into the data member. When thread A again executes, it resumes execution of the method. In this case, the value (i.e., 10) in its register is incremented (e.g., 11) and stored back into the data member. Thus, after execution of the method by both threads the data member will have a value of 11 rather than the expected value of 12. It may take a considerable amount of programming to develop a computer program that avoids various synchronization problems. The synchronization problems also occur when multiple processes, even with only one thread each, access shared memory. Thus, in general the problems occur when any threads, regardless of whether they are in the same or different processes, access objects in shared memory.

To help simplify development of such objects, an apartment model has been developed. According to the apartment model, each object can only be accessed by the single thread. Because each object can only be accessed by a single thread no synchronization problems occur as a result of multiple threads accessing the object concurrently. That is, the single thread can serially process each request to access the object. Thus, when a thread wants to access an object, it requests that the thread for the object perform the function on behalf of the requesting thread. The group of objects that can be accessed by a thread is referred to as an apartment. The apartment model is described in U.S. patent Ser. No. 08/381,635, entitled "Method and System for Multi-Threaded Processing," which is hereby incorporated by reference. A preferred technique for sending the request from one thread to another is referred to as marshalling and described in U.S. patent Ser. No. 5,511,197, entitled "Method and System for Network Marshalling of Interface Pointers for Remote Procedure Calls," which is hereby incorporated by reference.

When a programmer is developing a new object, the programmer needs to make a decision as to whether the object will be accessed only by a single thread or by multiple threads. If the object is to be accessed only by a single thread (i.e., an apartment-threaded object), then the implementation of the lo object is fairly straightforward because synchronization problems can be avoided by serializing access. Conversely, if the object is to be accessed by multiple threads (i.e., a free-threaded object), then the appropriate synchronization management mechanisms need to be developed. Unfortunately, apartment-threaded objects cannot be accessed by a server developed to access objects from any thread, and vice versa. When free-threaded objects are being used, a server is developed to simply pass pointers to the objects from one thread to another thread. The receiving thread would access the object directly, regardless of which thread created the object. Thus, if such a server loaded an apartment-threaded object, synchronization problems may occur as multiple threads accessed the object concurrently. Similarly, if a free-threaded object were executed in an apartment thread, the object may block in a manner that would cause the apartment to deadlock. Consequently, each class of object has an associated thread type. The thread type of the class can be either apartment-threaded or free-threaded. If a server is developed to use the apartment model, the server cannot instantiate free-threaded objects. Conversely, if the server is developed to use the free-threaded objects (i.e., a free-threading model), then the process cannot instantiate apartment-threaded objects. Two other thread types can be defined: single-threaded objects and both-threaded objects. A single-threaded object (referred to as a main-threaded object in the following) is an apartment-threaded object that can only be loaded into the apartment for the main thread of the process. A both-threaded object is compatible with both the apartment model and the free-threading model and thus can be loaded by a process that uses either model.

Although the apartment model does simplify the development of objects, the model has several drawbacks. First, if the computer has multiple processors, then the object can only be accessed by the processor that is executing the single thread and the other processors may be idle. Conversely, with the free-threaded objects, each thread that is accessing an object may be executing simultaneously on separate processors. Second, remote procedure call (RPC) mechanisms typically provide a dedicated thread for receiving calls from other processes. Thus, a thread context switch from the dedicated thread to the single thread may be needed. Conversely, a free-threaded object could execute in the dedicated thread. Third, because requests are nested, rather than queued, it may be that a first request is never completely serviced. That is, the last request received is serviced before the previously received requests are serviced. For example, when thread A is executing a method that was called from another thread, it may call a method in thread B, which in turn calls a method in thread A. If thread A did not process the second call when it was received, then the first call would never complete. However, if a first client calls a method in thread A, and many other clients call methods in thread A before the call by the first process completes, then the call by the first client may never complete because the thread is busy executing subsequent calls. Conversely, the threads with the free-threaded objects execute independently.

SUMMARY OF THE INVENTION

The present invention provides a method and system for providing access to apartment-threaded objects and free-threaded objects in memory shared by multiple threads. The system creates a single-threaded apartment that has a single-threaded apartment (STA) thread. The system loads each apartmentthreaded object into the single-threaded apartment. The system also creates a multi-threaded apartment that has one or more multi-threaded apartment (MTA) threads. The system loads each free-threaded object into the multi-threaded apartment. When the STA thread requests to access a free-threaded object, the system creates an MTA thread (or reactivates a deactivated thread) and requests that the MTA thread access the free-threaded object. The MTA thread then accesses the free-threaded object on behalf of the STA thread. When an MTA thread requests to access an apartment-threaded object, the system requests the STA thread to access the apartment-threaded object. The STA thread then accesses the apartment-threaded object from the STA thread on behalf of the MTA thread.

In another aspect of the present invention, both the MTA and the STA provide a host object through which objects can be instantiated in their respective apartments. Marshalled pointers to the host objects are placed in shared memory so that any thread can access the marshalled pointers. When an STA thread is to load a free-threaded object, the STA thread unmarshals the pointer for the host object of the MTA. The STA thread then invokes a method of the host object of the MTA. That invocation is sent to an MTA thread. The MTA host object instantiates the free-threaded object and returns a marshalled pointer to the instantiated object. When the STA thread receives the marshalled pointer, it unmarshals the pointer and uses the pointer to access the instantiated object. The instantiated object is accessed by requesting an MTA thread to access the instantiated object on behalf of the STA thread. When an MTA thread is to load an apartment-threaded object, then an analogous process occurs.

DETAILED DESCRIPTION OF THE INVENTION

The present invention provides a method and system that allows apartment-threaded objects and free-threaded objects to be loaded into memory shared by multiple threads in a manner that is transparent to the application programs. The mixed threading system (MTS) of the present invention supports multiple single-threaded apartments and one multi-threaded apartment in the shared memory. The MTS loads apartment-threaded objects into a single-threaded apartment and loads free-threaded objects into the multi-threaded apartment. Each single-threaded apartment is executed by a corresponding single-threaded apartment (STA) thread, and the multi-threaded apartment is executed by multiple multi-thread apartment (MTA) threads. When a thread requests to load an object, the MTS determines into which apartment the object should be loaded (i.e., free-threaded objects are loaded into the MTA and apartmnent-threaded objects are loaded into an STA, main-thread objects are loaded into the main STA thread, and both thread objects are loaded into the current thread). If the requesting thread matches the thread type of the object (e.g., an apartment-thread object and STA thread or a free-threaded object and an MTA thread), then the object is loaded into the apartment of the requesting thread. Thus, when the loaded object is then accessed by the requesting thread, it accesses the object directly from that thread. If, however, the requesting thread does not match the thread type of the object, then the MTS requests a thread that matches the thread type to load the object into its apartment and provides the requesting thread with a marshalled interface pointer to the object. Thus, whenever the loaded object is accessed by the requesting thread, then it is accessed using the marshalled interface pointer so that a thread context switch occurs so that the object can be executed by a thread in the appropriate apartment.

The MTS handles the accessing of an object through a marshalled interface pointer differently for each type of thread. If a thread uses a marshalled interface pointer to access an apartment-threaded object, then the MTS switches to the thread for that apartment to access the object on behalf of the requesting thread. If an STA thread uses a marshalled interface pointer to access a free-threaded object, then the MTS creates a new MTA thread and requests that the newly created thread access the object on behalf of the requesting STA thread. After the access is complete, then the MTA thread can be destroyed (or released to a pool of deactivated threads). Whenever an STA thread uses a marshalled interface pointer to access an object, then the thread enters a loop dispatching messages while the other thread accesses the object. Whenever an MTA thread uses a marshalled interface pointer to access an object, then the thread waits until the access is complete.

Figure 1:
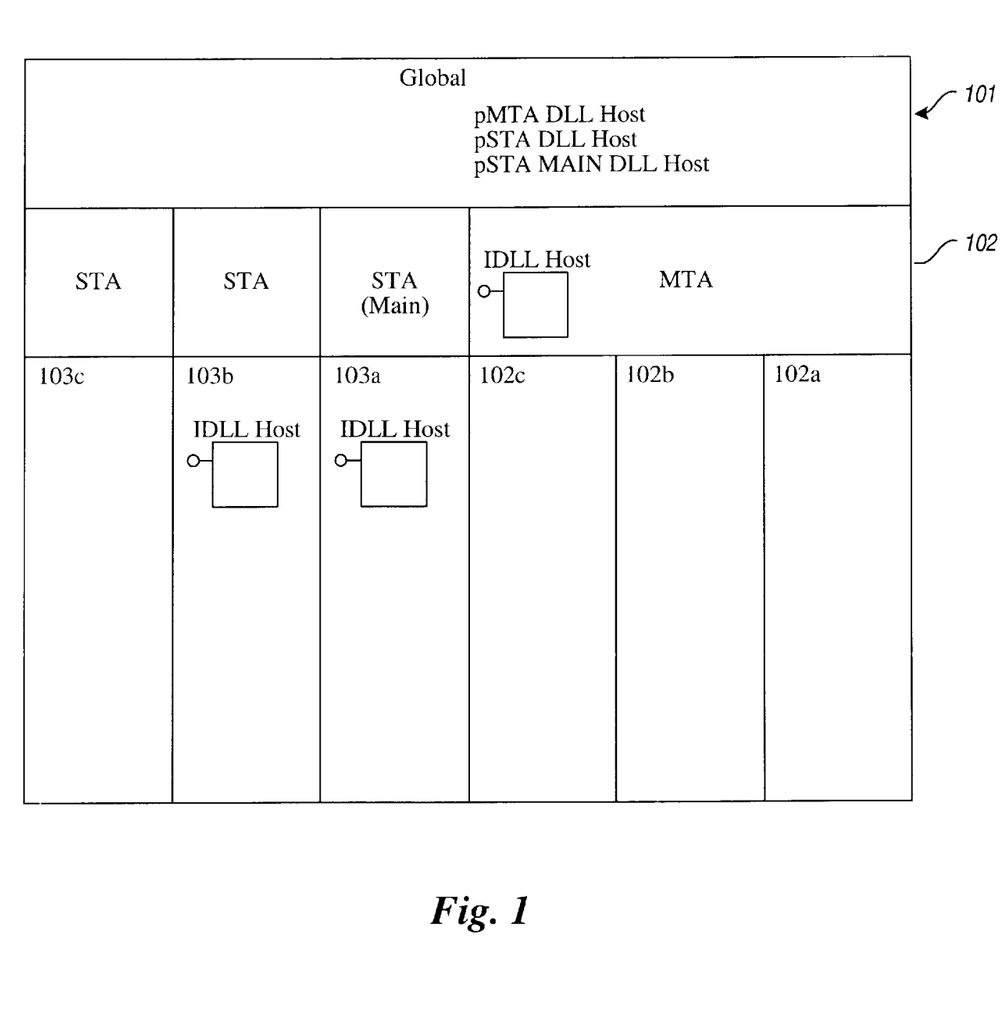
FIG. 1 is a block diagram illustrating the mixing of objects of different types in a single process.

FIG. 1 is a block diagram illustrating the mixing of objects of different thread types in a single process. Although the description below refers to threads in a single process, the techniques of the present invention may be used with threads in different processes that share memory. The process has a global area 101, multi-threaded apartment (MTA) 102 with three threads 102*a*, 102*b*, 102*c*, and three single-threaded apartments (STA) for threads 103*a*, 103*b*, 103*c*. The MTS keeps track of the apartments and threads. Three threads are designated as host threads: host STA thread 103*b*; main STA thread 103*a*; and host MTA thread 102*c*. The host threads provide access to a host object that controls the instantiation of objects. When one thread requests an object to be instantiated that needs to be in a different apartment, the MTS retrieves from the global area a marshalled interface pointer to the host object for the apartment in which the object is to be created. The MTS unmarshals the interface pointer and invokes a method of the host object to instantiate the object. The host object instantiates the object and returns a marshalled interface to the instantiated object. The requesting thread then unmarshals the interface pointer and uses it to access the object.

Figure 2:
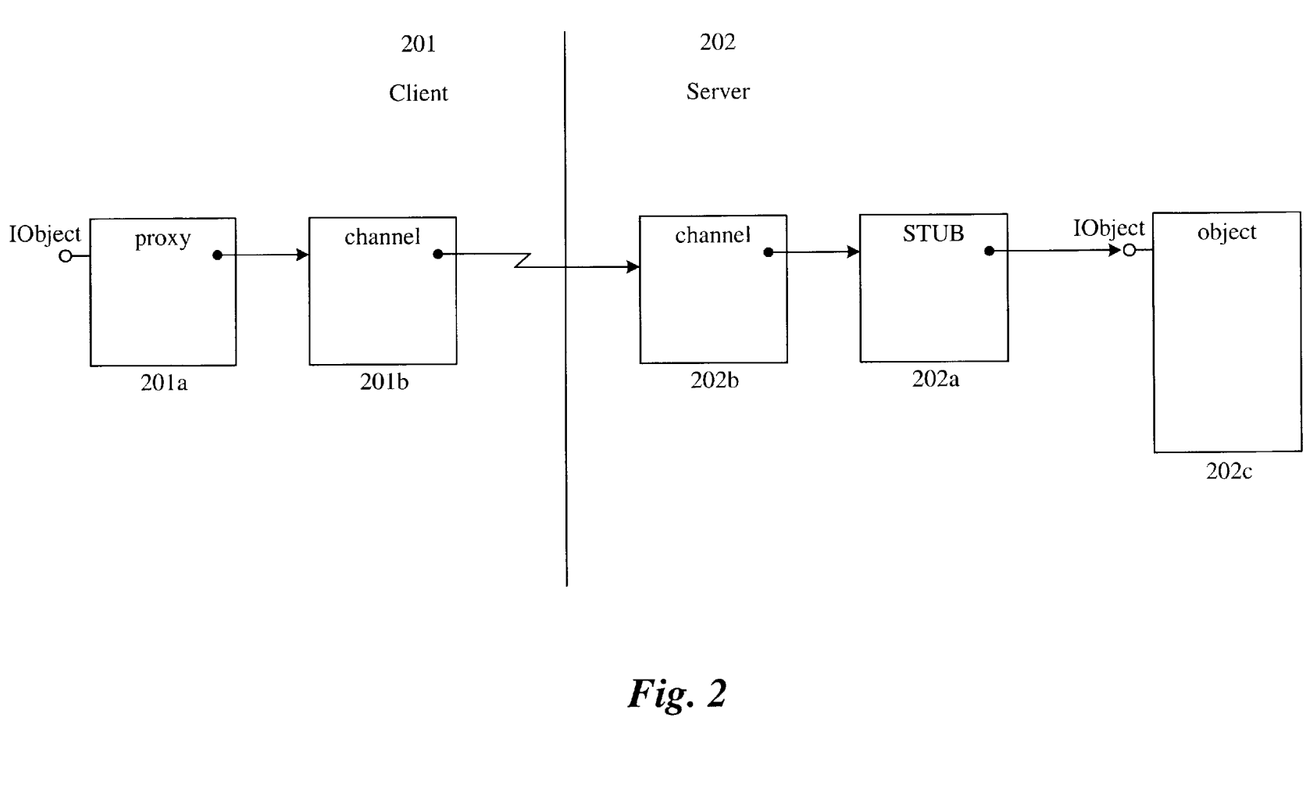
FIG. 2 is a block diagram illustrating marshalling techniques used in the present invention.

FIG. 2 is a block diagram illustrating marshalling techniques used in the present invention. When a pointer to an interface is passed from one thread (i.e., a server thread) 202 to another thread (i.e., a client thread) 201, the MTS creates proxy and stub objects to control the inter-thread invoking of the methods. The proxy object 201*a* is instantiated within the client thread and contains an implementation of the same interface (e.g., IObject) that the object 202*c* exposes. When the client thread invokes a method of the proxy object, the proxy object marshals the parameters of the method and passes the request to invoke that method to the channel object 201*b*. The channel object contains the network address of the corresponding server channel object 202*b*. The channel object may need to create a server thread to process the request. The channel object forwards the request to the server thread. The channel object on the server thread forwards the request to invoke the method to the stub object 202*a*. The stub object unmarshals the parameters of the message and invokes the corresponding method of the object 202*c*. When the method returns, the stub object packages the return parameters and forwards them to the channel object 202*b*. The channel object then sends that message to the channel object 201*b*. The channel object forwards the message to the proxy object which unmarshals the parameters and returns to the client.

Figure 3:
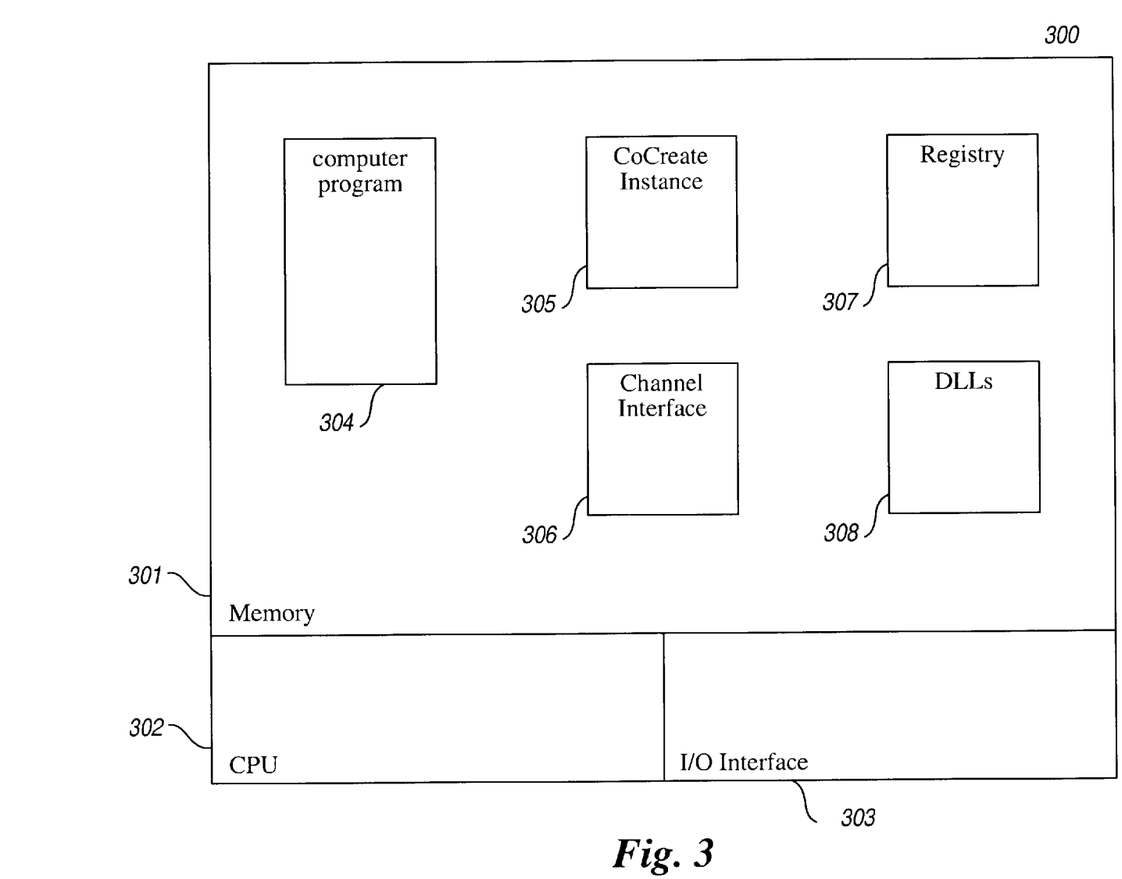
FIG. 3 is a block diagram illustrating a computer system for practicing the present invention.

FIG. 3 is a block diagram illustrating a computer system for practicing the present invention. The computer system 300 includes primary storage 301, a central processing unit (CPU) 302, and an I/O interface 303. The primary storage contains a multi-threaded computer program 304, a CoCreateInstance function 305, a channel interface 306, a system registry 307, and loaded dynamic link libraries (DLL) 308. The computer program invokes the CoCreateInstance function to instantiate an object of a certain class. The function determines from the registry the name of the DLL that contains the code for that class and the thread type of that class (e.g., free-threaded). The function loads the DLL and effects the instantiation of that object in the appropriate apartment. The function then returns an interface pointer that points either directly to the object or to a proxy for the object. When the proxy is invoked, the channel code effects the invoking of the method by the appropriate thread.

Figure 4A:
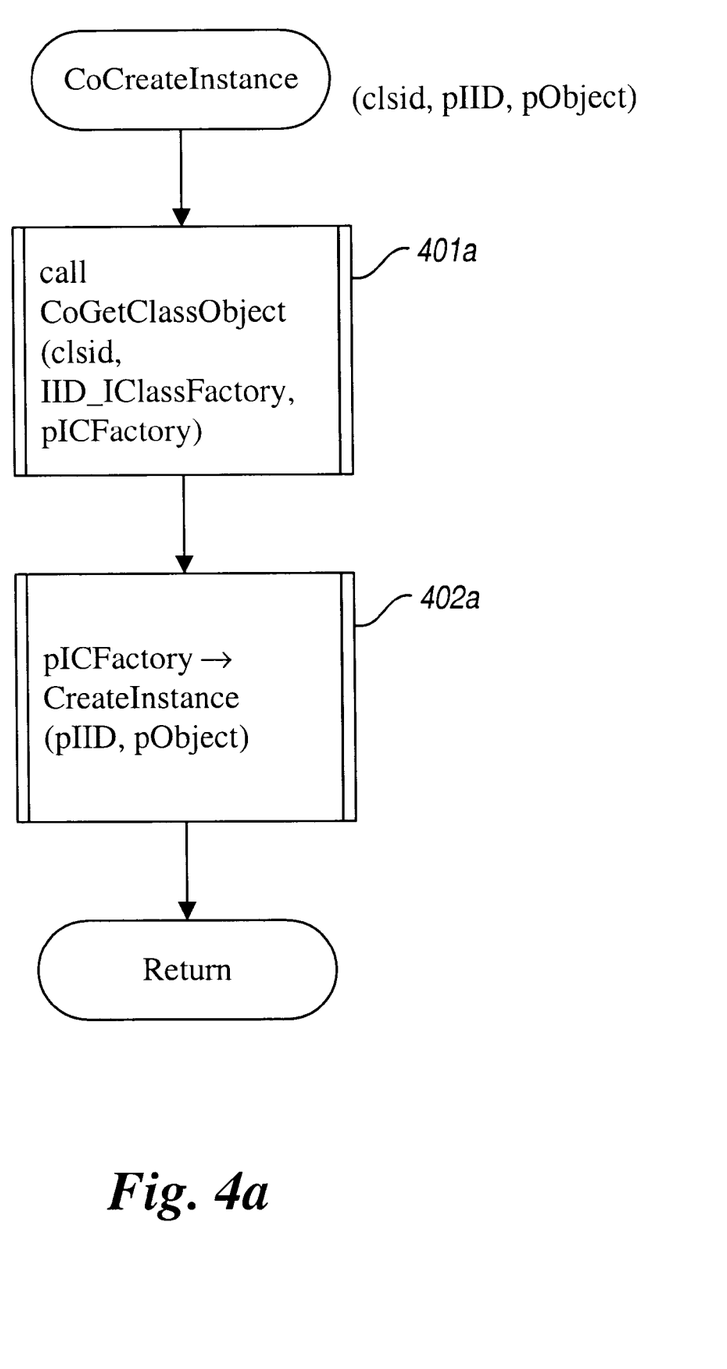
FIG. 4a is a flow diagram of an implementation of the CoCreateinstance function.

FIG. 4*a* is a flow diagram of an implementation of CoCreateInstance function. The CoCreateinstance function is passed the identifier of a class and the identifier of an interface supported by that class. The function instantiates an object of that class and returns a pointer to the interface for that object. In step 401*a*, the function invokes the CoGetClassObject function passing the identifier of the class and the identifier of the class factory interface. The class factory interface provides a method for creating instances of objects. In step 402*a*, the function invokes the method CreateInstance of the returned class factory passing the identifier of the interface for the object. The method creates an instance of the object and returns a pointer to interface. The function then returns.

Figure 4B:
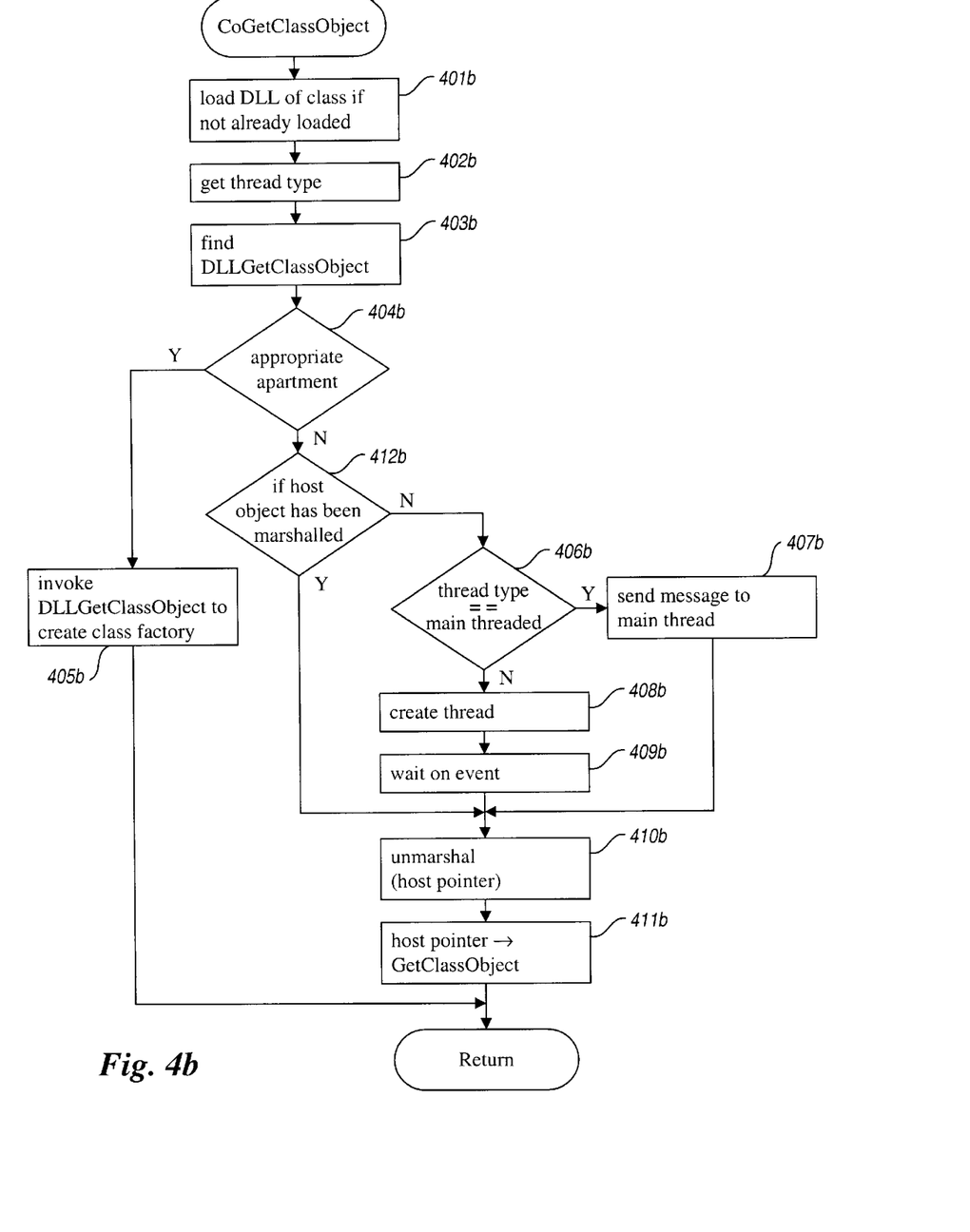
FIG. 4b is a flow diagram of an implementation of the CoGetClassObject function.

FIG. 4*b* is a flow diagram of an implementation of the CoGetClassObject function. The CoGetClassObject function is passed the identifier of a class and returns a pointer to the class factory interface for that class. In step 401*b*, the function checks the global registry to identify the dynamic link library (DLL) that contains the code for the identified class. If the DLL for the class is not already loaded, then the function loads the DLL. In step 402*b*, the function retrieves the thread type of the class from the registry. In step 403*b*, the function retrieves a reference to the DLLGetClassObject function in is the loaded DLL. In step 404*b*, the function determines whether the object can be created in the current apartment. If the object can be created in the current apartment, then the function continues at step 405*b*, else the function continues at step 412*b*. The object can be instantiated in the current apartment in the following circumstances:

(1) the thread type of the class is both-threaded;

(2) the thread type of the class is apartment-threaded (but not main-threaded) and the current apartment is an STA;

(3) The thread type of the class is free-threaded and the current apartment is the MTA; and (4) the thread type of the class is main-threaded and the current apartment is the main STA.

In step 405b, the function invokes the DLLGetClassObject function to instantiate the class factory in the current apartment and returns a pointer to the class factory. In step 412b, if the host object has been marshalled, then the function continues at step 410b, else the function continues at step 406b. In steps 406b–411b, the function causes the class factory to be created in another apartment that matches the thread type. In step 406b, if the thread type of the class is main-threaded, then the function continues at step 407b, else the function continues at step 408b. In step 407b, the function sends a message to the main STA thread to instantiate the class factory. The sending of the message is synchronized in that control does not return until the message has been processed by the main STA thread. In step 408b, the function creates a thread in an apartment for the class factory. In step 409b, the function waits on an event to signal the completion of the creation of the thread. In step 410b, the function unmarshals the host pointer that the created thread stored in the global memory. In step 411b, the function invokes the method GetClassObject of the host object to create the class factory and to retrieve a marshalled pointer to the class factory. The function then returns a pointer to the proxy class factory after unmarshalling the pointer.

Figure 5:
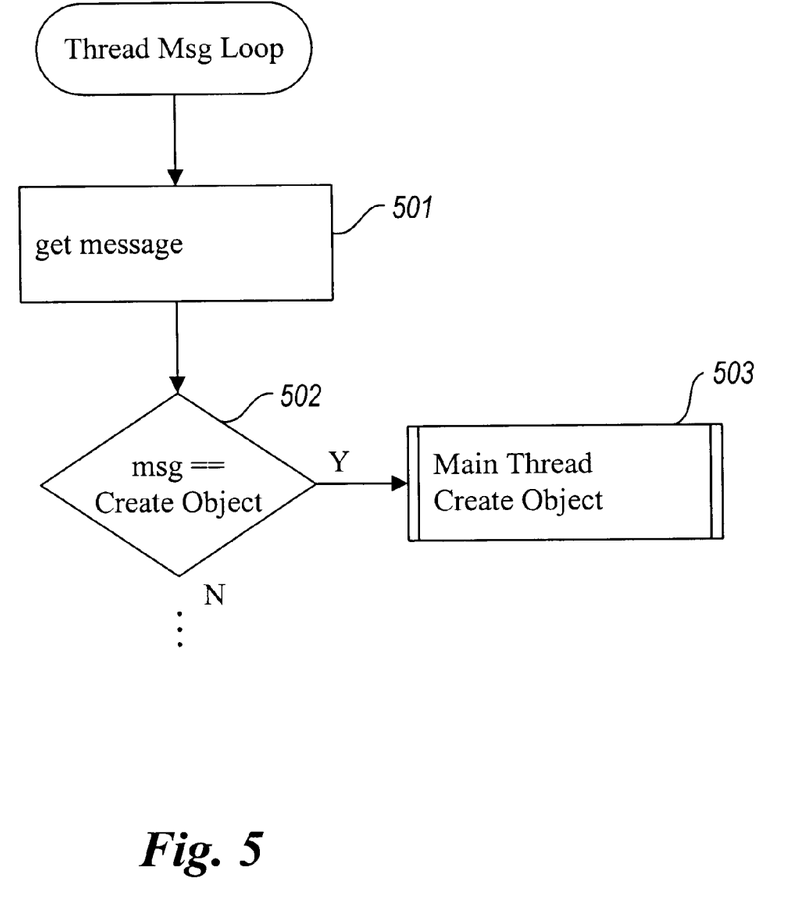
FIG. 5 is a flow diagram of a portion of the message loop for the main STA thread of the process.

FIG. 5 is a flow diagram of a portion of the message loop for the main STA thread of the process. The main STA thread receives messages to instantiate apartment-threaded objects within its apartment. In step 501, the message loop retrieves the next message. In step 502, if the message indicates that an object is to be created, then the message loop continues at step 503, else the message loop continues its normal processing for messages. In step 503, the message invokes the routine to create an object for the main thread.

Figure 6:
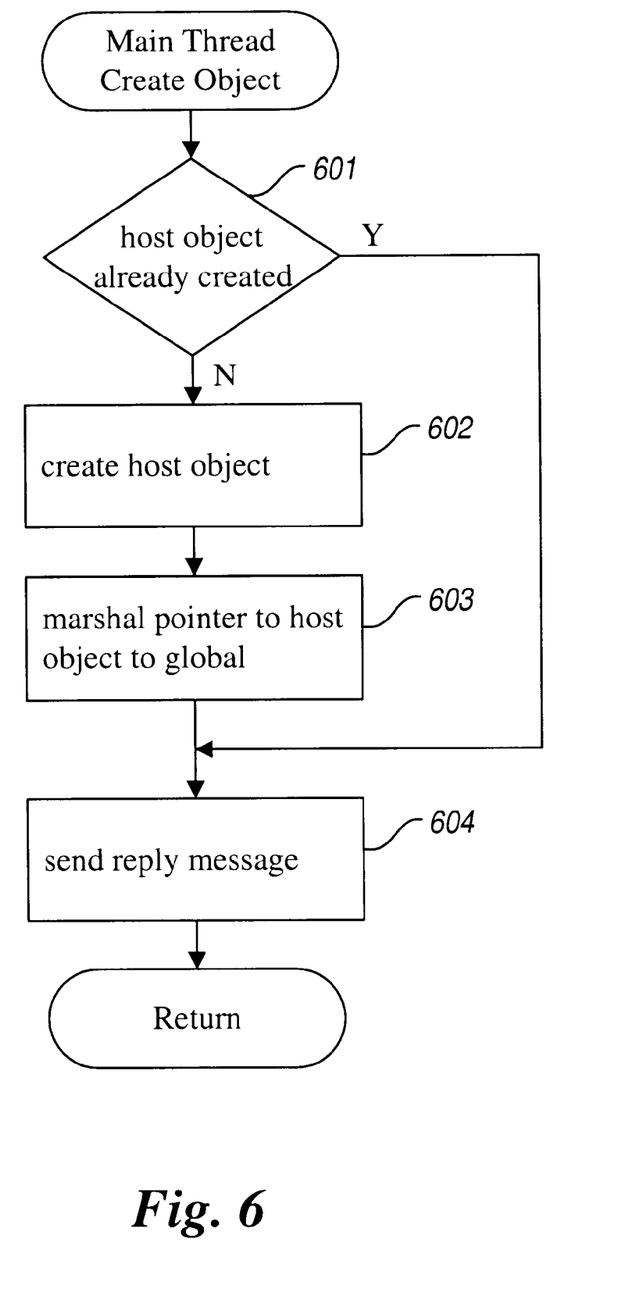
FIG. 6 is flow diagram of the routine to create the host object in the main STA thread.

FIG. 6 is flow diagram of the routine to create an object in the main STA thread. In step 601, if the host object for the main STA thread has already been created, then the routine skips to step 604, else the routine continues at step 602. In step 602, the routine creates the host object. In step 603, the routine marshals a pointer to the host object to an area of global memory. In step 604, the routine sends a reply message and returns.

Figure 7:
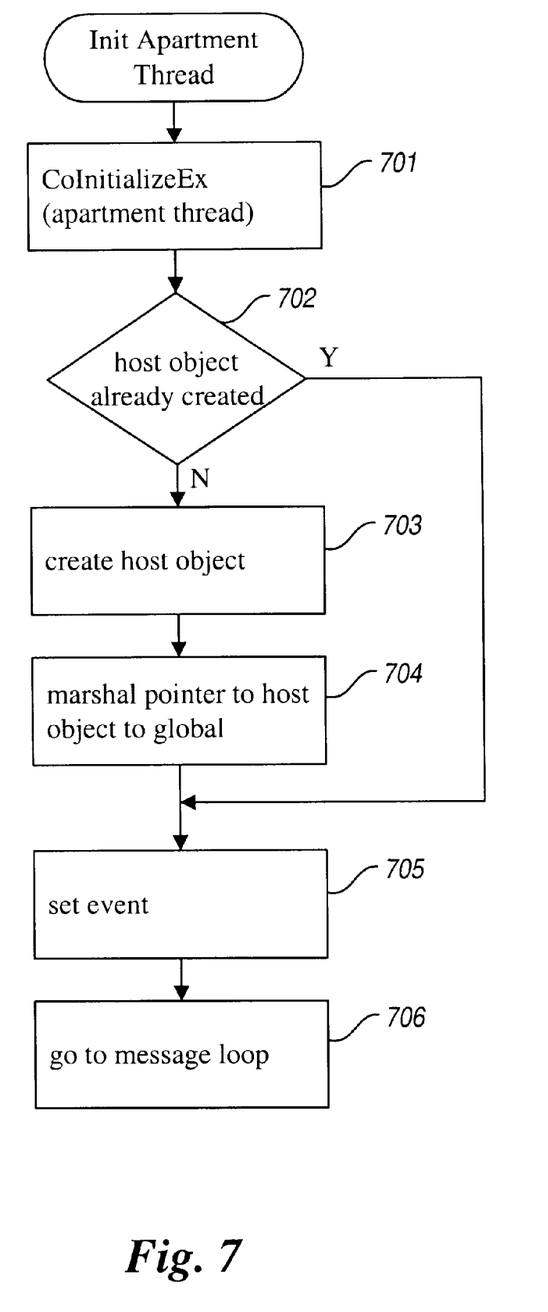
FIG. 7 is a flow diagram of the initialization process of an STA thread.

FIG. 7 is a flow diagram of the initialization process of an (non-main) STA thread. When a thread is initialized, it performs this process if it is a non-main STA thread. In step 701, the routine invokes the function CoInitializeEx indicating that an STA thread is being initialized. The function CoInitializeEx tracks the threads so that the requests to access objects can be sent to the appropriate thread. In step 702, if the host object for the STAs has already been created, then the routine skips to step 705, else the routine continues at step 703. In step 703, the routine creates the host object for the non-main STA threads. In step 704, the routine marshals the pointer to the host object to global memory. In step 705, the routine sets the event to indicate that the pointer to the host object is in global memory. The setting of this event notifies the client thread that the pointer to the host object is in global memory. In step 706, the routine goes to the message loop for the apartment thread.

Figure 8:
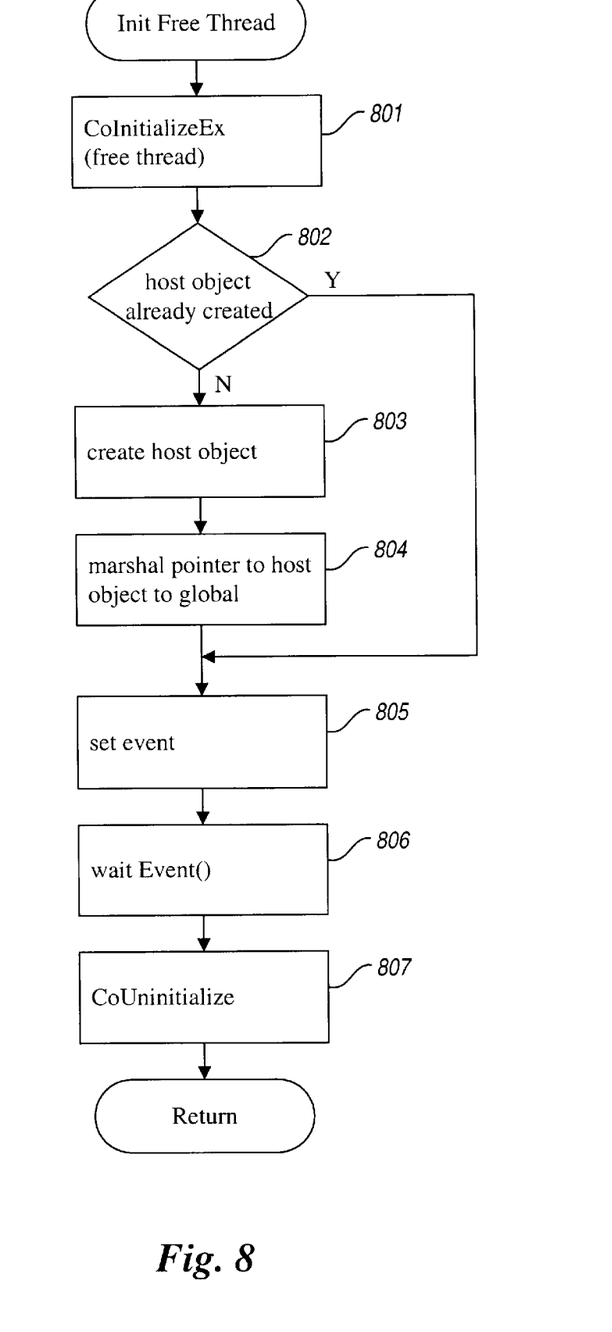
FIG. 8 is a flow diagram of the routine to initialize an MTA thread.

FIG. 8 is a flow diagram of the routine to initialize an MTA thread. In step 801, the routine invokes the function CoInitializeEx indicating that an MTA thread is being initialized. In step 802, if the host object for the MTA has already been created, then the routine skips to step 805, else the routine continues at step 803. In step 803, the routine creates the host object for the free threads. In step 804, the routine marshals a pointer to the host object to the global memory. In step 805, the routine sets the event to indicate that the pointer to the host object is in global memory. In step 806, the routine blocks on an event to keep the thread alive until the process uninitializes. In step 807, the routine invokes the function CoUninitialize to uninitialize the thread and returns.

Figure 9:
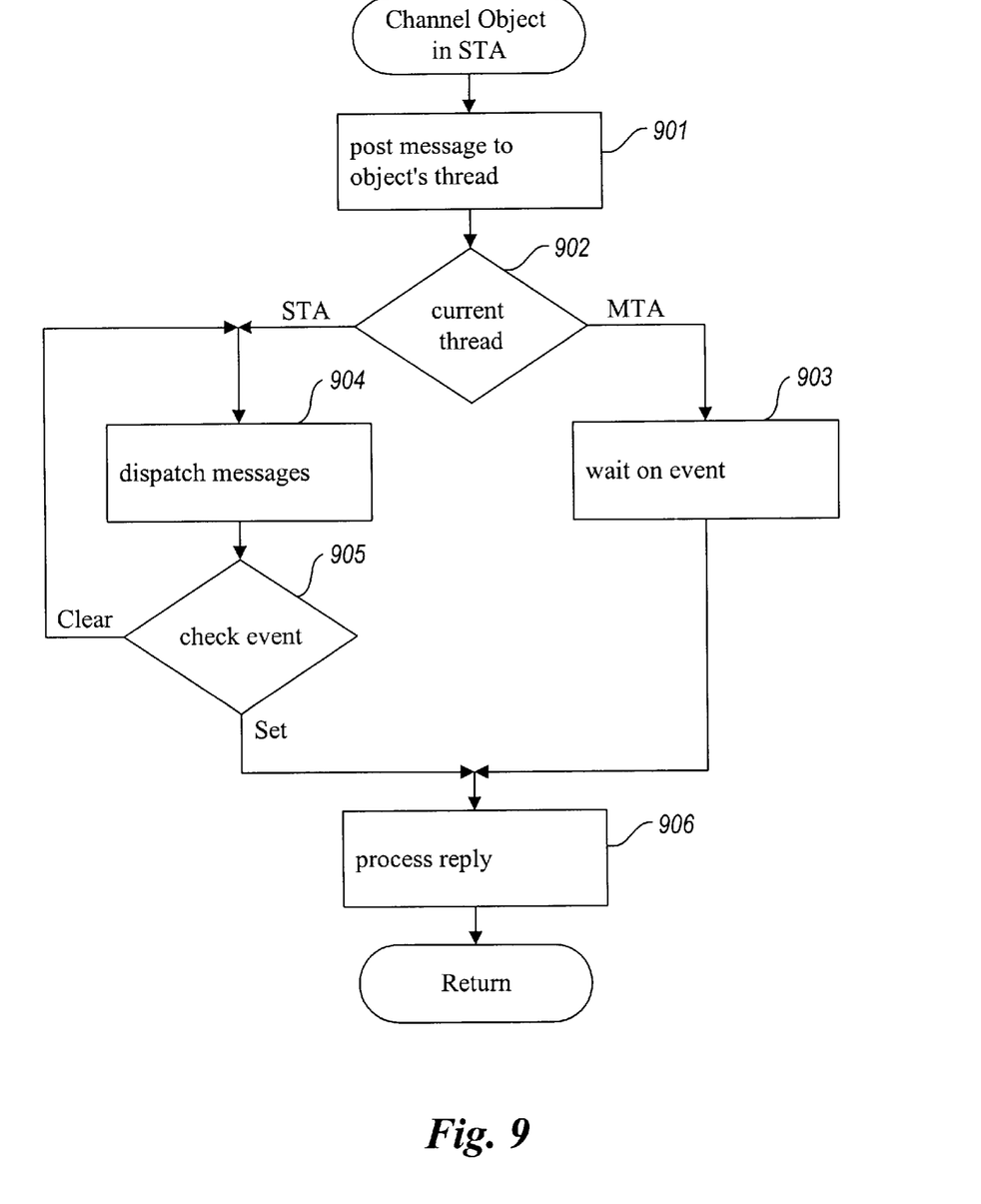
FIG. 9 is a flow diagram of the channel processing when an apartment-threaded object is accessed.

FIG. 9 is a flow diagram of the channel processing when the object is in an STA. In step 901, the routine posts a message to the thread for the apartment that contains the object. In step 902, if the current thread is an MTA thread then the routine continues at step 903, else the routine continues at step 904. In step 903, the routine waits until the event is set by the thread that processed the request. An MTA thread suspends until the event is set. In steps 904-905, the routine loops dispatching messages and checking the event. An STA thread needs to continue dispatching messages in case the object that is invoked accesses an object that can only be accessed through this thread. In step 904, the routine dispatches any messages on the message loop. In step 905, if the event has been set, then the routine continues in step 906, else the routine loops to step 905. In step 906, the routine processes the reply and returns.

Figure 10:
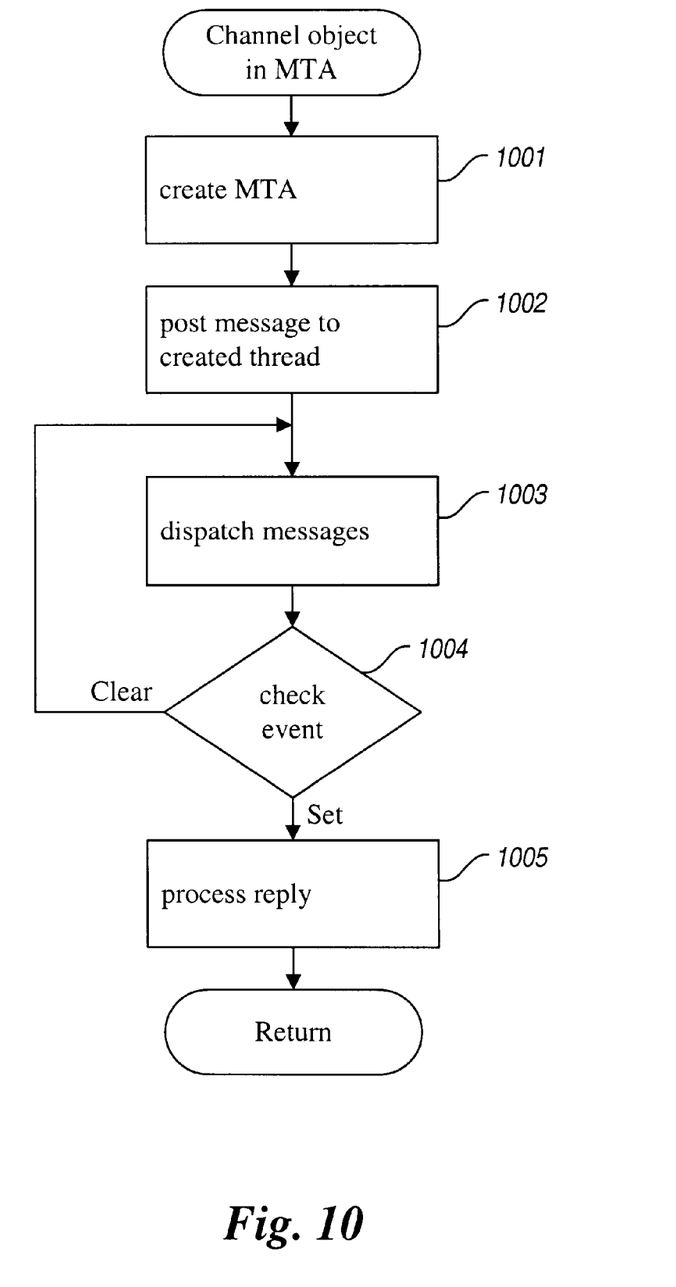
FIG. 10 is a flow diagram of the channel processing when a free-threaded object is accessed.

FIG. 10 is a block diagram of the channel processing when the object is in the MTA. In step 1001, the function creates an MTA thread or allocates an MTA thread from a pool of available threads. In step 1002, the routine sets an event to wake the thread to process the request. In steps 1003-1004, the routine loops dispatching messages and checking for the event. Only an STA thread will access a free-threaded object using marshalling. (Any MTA thread can access any free-threaded object directly.) Therefore, the messages for the STA threads are dispatched. In step 1003, the routine dispatches any messages. In step 1004, if the event is set, then the routine continues in step 1005, else the routine loops to step 1003. In step 1005, the routine processes the reply message and returns.

Figure 11:
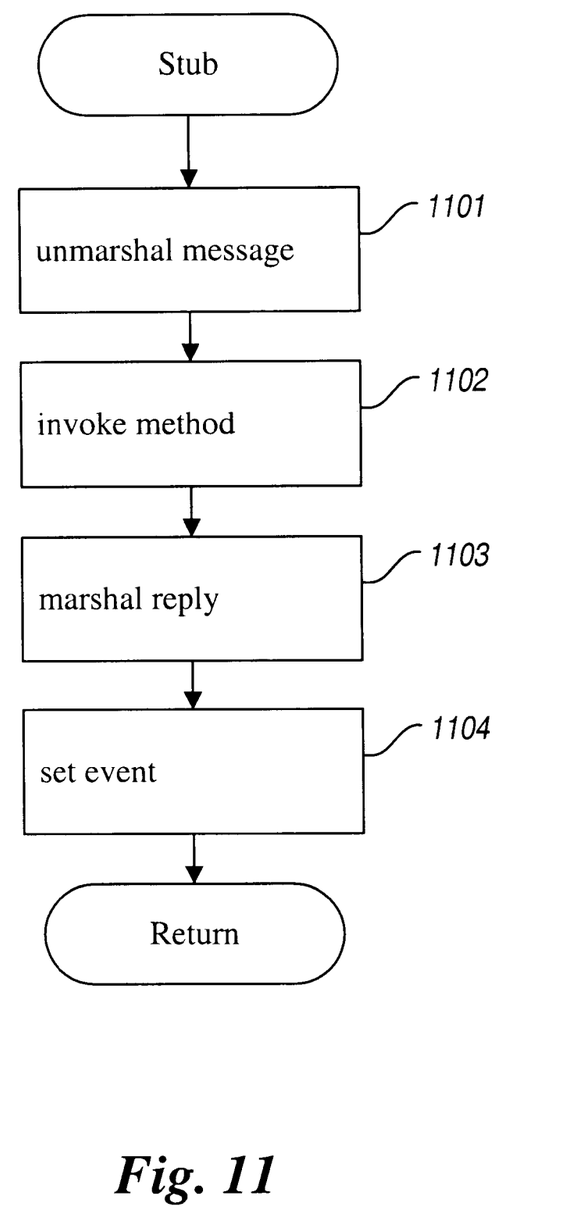
FIG. 11 is a flow diagram of a stub routine.

FIG. 11 is a flow diagram of a stub routine. In step 1101, the stub routine unmarshals the message provided by the channel. In step 1102, the stub invokes the method of the object. In step 1103, the stub marshals any return parameters into a reply and forwards them to the channel and returns. The channel then forwards the reply and sets the event.

Although the present invention has been described in terms of a preferred embodiment, it is not intended that the invention be limited to this embodiment. Modifications within the spirit of the invention will be apparent to those skilled in the art. The scope of the present invention is defined by the claims that follow.

We claim:

1. A method in a computer system for accessing objects of different thread types in a single process, the method comprising:

during execution of a single-threaded apartment (STA) thread,
  requesting access to a free-threaded object; and
  in response to the request to access a free threaded object,
    creating a multi-threaded apartment (MTA) thread;
    requesting the MTA thread to instantiate the free threaded object;
    receiving a marshalled pointer to the free-threaded object;
    unmarshalling the received pointer; and
    accessing the instantiated free-threaded object using the unmarshalled pointer wherein an MTA thread accesses the free-threaded object on behalf of the STA thread; and during execution of an MTA thread,
  requesting access to an apartment-threaded object; and
  in response to the request to access an apartment-threaded object,
    creating an STA thread;
    requesting the STA thread to instantiate the apartment-threaded object;
    receiving a marshalled pointer to the apartmnent-threaded object;
    unmarshalling the received pointer; and
    accessing the instantiated apartment-threaded object using the unmarshalled pointer wherein the STA thread accesses the apartment-threaded object on behalf of the MTA thread.

2. A method in a computer system for accessing a free-threaded object from a single-threaded apartment thread (STA) thread, the method comprising:
  during execution of the STA thread,
    requesting access to the free-threaded object; and
    in response to the request to access a free-threaded object,
      selecting a multi-threaded apartment (MTA) thread for accessing the object;
      requesting the selected MTA thread to access the free-threaded object on behalf of the STA thread;
      dispatching messages received while the MTA thread is accessing the free-threaded object; and
      receiving notification that the MTA thread has completed accessing the free-threaded object.

3. The method of claim 2 wherein the selecting of an MTA thread includes creating an MTA thread.

4. The method of claim 2 wherein the selecting of an MTA thread selects an already created thread.

5. The method of claim 2 including before requesting access to the free-threaded object, receiving a marshalled pointer to the free-threaded object and unmarshalling the pointer and wherein the requesting of access to the free-threaded object uses the unmarshalled pointer.

6. The method of claim 2 including when the free-threaded object has not been instantiated, requesting the MTA thread to instantiate the free-threaded object wherein the MTA thread provides the STA thread with a marshalled pointer to the free-threaded object.

7. The method of claim 6 wherein the STA thread unmarshals the pointer and requests access to the free-threaded object using the unmarshalled pointer.

8. The method of claim 2 wherein the requesting of the selected MTA thread includes switching to the MTA thread.

9. A method in a computer system for accessing an apartment-threaded object from a multi-threaded apartment (MTA) thread, the method comprising:
  during execution of the MTA thread,
    requesting access to the apartment-threaded object; and
    in response to the request to access the apartment-threaded object,
      selecting a single-threaded apartment (STA) thread to access the object;
      requesting the selected STA thread to access the apartment threaded object on behalf of the MTA thread;
      suspending execution while the STA thread is accessing the apartment-threaded object; and
      resuming execution when notified that the STA thread has completed accessing the apartment-threaded object.

10. The method of claim 9 wherein the selecting of an STA thread selects an already created thread.

11. The method of claim 9 wherein when the apartment-threaded object is a main-threaded object, then the selecting selects the main STA thread.

12. The method of claim 9 including before requesting access to the apartment-threaded object, receiving a marshalled pointer to the apartment-threaded object, and unmarshalling the pointer and wherein the requesting of access to the apartment-threaded object uses the unmarshalled pointer.

13. The method of claim 9 including when the apartment-threaded object has not been instantiated, requesting the STA thread to instantiate the apartment-threaded object wherein the STA thread provides the MTA thread with a marshalled pointer to the apartment-threaded object.

14. The method of claim 9 wherein the MTA thread unmarshals the pointer and requests access to the apartment-threaded object using the unmarshalled pointer.

15. A method in a computer system for providing access to apartment-threaded objects and free-threaded objects in memory shared by multiple threads, the method comprising:
  creating a single-threaded apartment having a single-threaded apartment (STA) thread, each apartment object being loaded into the single-threaded apartment;
  creating a multi-threaded apartment having multiple multi-threaded apartment (MTA) threads, each free-threaded object being loaded into the multi-threaded apartment;
  when the STA thread requests to access a free-threaded object, accessing the free-threaded object from a selected MTA thread on behalf of the STA thread; and
  when a MTA thread requests to accesses an apartment-threaded object, accessing the apartment threaded object from the STA thread on behalf of the MTA thread.

16. The method of claim 15 wherein the STA thread dispatches messages while the MTA thread is accessing the free-threaded object.

17. The method of claim 15 wherein the MTA thread suspends while the STA thread is accessing the apartment-threaded object.

18. The method of claim 15 wherein the STA thread provides a pointer to a marshalled host object and wherein the MTA thread unmarshals the pointer to the host object and invokes a method of the host object to instantiate an apartment-threaded object and to return a marshalled pointer to the instantiated object.

19. The method of claim 18 wherein the MTA thread unmarshals the pointer to the instantiated object and uses the unmarshalled pointer to request access to the instantiated object.

20. The method of claim 15 wherein an MTA thread provides a pointer to a marshalled host object and wherein the STA thread unmarshals the pointer to the host object and invokes a method of the host object to instantiate a free-threaded object and to return a marshalled pointer to the instantiated object.

21. The method of claim 20 wherein the STA thread unmarshals the pointer to the instantiated object and uses the unmarshalled pointer to request access to the instantiated object.

22. A computer-readable medium containing instructions for causing a computer system to provide access to apartment-threaded objects and free-threaded objects in memory shared by multiple threads, by:
  creating a single-threaded apartment having a single-threaded apartment (STA) thread, each apartment object being loaded into the single threaded apartment;

creating a multi-threaded apartment having multiple multi-threaded apartment (MTA) threads, each free-threaded object being loaded into the multi-threaded apartment;

when the STA thread requests to access a free-threaded object, creating an MTA thread and accessing the free-threaded object from created MTA thread on behalf of the STA thread; and when a MTA thread requests to accesses an apartment-threaded object, accessing the apartment threaded object from the STA thread on behalf of the MTA thread.

23. The computer-readable medium of claim 22 wherein the STA thread dispatches messages while the MTA thread is accessing the free-threaded object.

24. The computer-readable medium of claim 22 wherein the MTA thread suspends while the STA thread is accessing the apartment-threaded object.

25. The computer-readable medium of claim 22 wherein the STA thread provides a pointer to a marshalled host object and wherein the MTA thread unmarshals the pointer to the host object and invokes a method of the host object to instantiate an apartment-threaded object and to return a marshalled pointer to the instantiated object.

26. The computer-readable medium of claim 25 wherein the MTA thread unmarshals the pointer to the instantiated object and uses the unmarshalled pointer to request access to the instantiated object.

27. The computer-readable medium of claim 22 wherein an MTA thread provides a pointer to a marshalled host object and wherein the STA thread unmarshals the pointer to the host object and invokes a method of the host object to instantiate a free-threaded object and to return a marshalled pointer to the instantiated object.

28. The computer-readable medium of claim 27 wherein the STA thread unmarshals the pointer to the instantiated object and uses the unmarshalled pointer to request access to the instantiated object.

* * * * *